United States Patent
Chien (10) Patent No.: US 11,329,555 B2
(45) Date of Patent: May 10, 2022

(54) VOLTAGE MODULATION CIRCUIT AND METHOD THEREOF

(71) Applicant: REALTEK SEMICONDUCTOR CORP., Hsinchu (TW)

(72) Inventor: Chih-Kang Chien, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 17/336,950

(22) Filed: Jun. 2, 2021

(65) Prior Publication Data

US 2022/0077775 A1 Mar. 10, 2022

(30) Foreign Application Priority Data

Sep. 4, 2020 (TW) .................................. 109130516

(51) Int. Cl.
*H02M 3/07* (2006.01)
*H02M 1/084* (2006.01)
*H02M 1/00* (2006.01)

(52) U.S. Cl.
CPC .............. *H02M 3/07* (2013.01); *H02M 1/009* (2021.05); *H02M 1/0845* (2013.01)

(58) Field of Classification Search
CPC ....... H02M 3/07; H02M 1/009; H02M 1/0845
USPC ........................................................ 327/536
See application file for complete search history.

(56) References Cited

U.S. PATENT DOCUMENTS

| | | | | |
|---|---|---|---|---|
| 7,307,466 B2* | 12/2007 | Imamiya | ................ | G11C 5/143 327/536 |
| 8,111,107 B2* | 2/2012 | Huang | ................... | H03L 7/0995 331/17 |
| 8,710,911 B2* | 4/2014 | Chien | ..................... | H02M 3/07 327/536 |
| 2002/0057124 A1* | 5/2002 | Chan | ..................... | H02M 3/073 327/536 |
| 2006/0197583 A1* | 9/2006 | Yen | ......................... | H02M 3/07 327/536 |
| 2011/0316617 A1* | 12/2011 | Huang | ................... | G11C 5/145 327/536 |
| 2013/0321045 A1* | 12/2013 | Kern | ..................... | H03L 7/0895 327/142 |

* cited by examiner

*Primary Examiner* — Tomi Skibinski
(74) *Attorney, Agent, or Firm* — Birch, Stewart, Kolasch & Birch, LLP (57) ABSTRACT

A voltage modulation circuit includes a charge pump circuit and a voltage detection circuit. The voltage detection circuit is coupled to the charge pump circuit. Herein, the charge pump circuit supports a plurality of power supply modes with different conversion rates and is configured to perform a power supply operation in a selected power supply mode of the power supply modes according to a control signal, to convert a power supply voltage into at least one output voltage, and to output a wake-up signal when switching of the selected power supply mode meets a specific condition. The voltage detection circuit is activated by the wake-up signal, and is configured to detect the output voltage and to suspend the power supply operation of the charge pump circuit according to a magnitude of the output voltage.

20 Claims, 6 Drawing Sheets

FIG. 14

VOLTAGE MODULATION CIRCUIT AND METHOD THEREOF

CROSS-REFERENCE TO RELATED APPLICATION

This non-provisional application claims priority under 35 U.S.C. § 119(a) to patent application Ser. No. 10/913,0516 in Taiwan, R.O.C. on Sep. 4, 2020, the entire contents of which are hereby incorporated by reference.

BACKGROUND

Technical Field

The present invention relates to a charge pump circuit and a related method thereof, and in particular, to a voltage modulation circuit and a method thereof.

Related Art

Currently, codec (coder-decoder) chips are mainly used in two fields: personal computers (PCs) and consumer electronics (CEs). In terms of CE, both mobile phones and multimedia players (such as a MP3 player) emphasize the use of a power saving mode, to achieve a long standby time. In terms of PC, the popularity of notebook computers (NB) and the rise of tablet computers have led to more stringent power-saving requirements for internal chips. In the power planning of the entire codec chip, in addition to the speaker drive circuit requiring the largest output wattage, the headphone drive circuit also consumes considerable power. Therefore, in each of the drive circuit, a charge pump circuit is used to generate a stable output voltage to drive an amplifier in the drive circuit.

The charge pump circuit uses a power modulation technology to make the output voltage change in a wide range and maintain a specific level of conversion efficiency, to provide output voltages that are different multiples of the power supply voltage in various operating modes. Therefore, the audio playing efficiency of a power amplifier of the drive circuit of the charge pump circuit can be greatly improved. However, in a mode switching process of the charge pump circuit, the input power supply voltage is often recharged by a large amount of charges. In such a case, input overvoltage protection may be triggered to reboot a device and cause signal interruption, or even burn the front-end or back-end chips and cause serious losses.

SUMMARY

In an embodiment, a voltage modulation circuit includes a charge pump circuit and a voltage detection circuit. The voltage detection circuit is coupled to the charge pump circuit. Herein, the charge pump circuit supports a plurality of power supply modes with different conversion rates and is configured to perform a power supply operation in a selected power supply mode of the power supply modes according to a control signal, to convert a power supply voltage into at least one output voltage, and to output a wake-up signal when switching of the selected power supply mode meets a specific condition. The voltage detection circuit is activated by the wake-up signal and is configured to detect the output voltage and to suspend the power supply operation of the charge pump circuit according to a magnitude of the output voltage.

In an embodiment, a voltage modulation method includes: switching from one of a plurality of power supply modes with different conversion rates to another one of the power supply modes according to a control signal, to be as a selected power supply mode; performing, by a power supply circuit, a power supply operation in the selected power supply mode, to convert a power supply voltage into at least one output voltage for supplying power to a post-stage circuit; outputting a wake-up signal when the switching step meets a specific condition; starting a detection process of the output voltage according to the wake-up signal; and suspending the power supply operation of the power supply circuit according to a magnitude of the output voltage under the detection process.

In conclusion, the voltage modulation circuit and the method thereof according to the instant disclosure can suspend the power supply operation of the charge pump circuit when the switching of the selected power supply mode meets the specific condition, to be drawn proactively current by the post-stage circuit, so that the output voltage changes slowly. Therefore, an original residual charge does not recharge to a power supply, but can be effectively used without loss, thereby reducing long-term power consumption and eliminating heat accumulation. In addition, the voltage detection circuit used herein is very easy to be implemented, does not require high resolution, and requires a relatively small hardware area.

DETAILED DESCRIPTION

As used herein, "coupled" or "connected" may mean that two or more components are directly physical or electrical contact with each other or are indirectly physical or electrical contact with each other, and may also mean that two or more components operate or interact with each other. In addition, the terms such as "first", "second", "third", and "fourth" are used for distinguishing the referred components, but are not used for sorting or limiting a difference of the referred components, and are not intended to limit the scope of the present invention. As used herein, "A and/or B" refers to one or any combination (for example, A, B, or a combination of A and B) of the listed related items (A and B).

Figure 1:
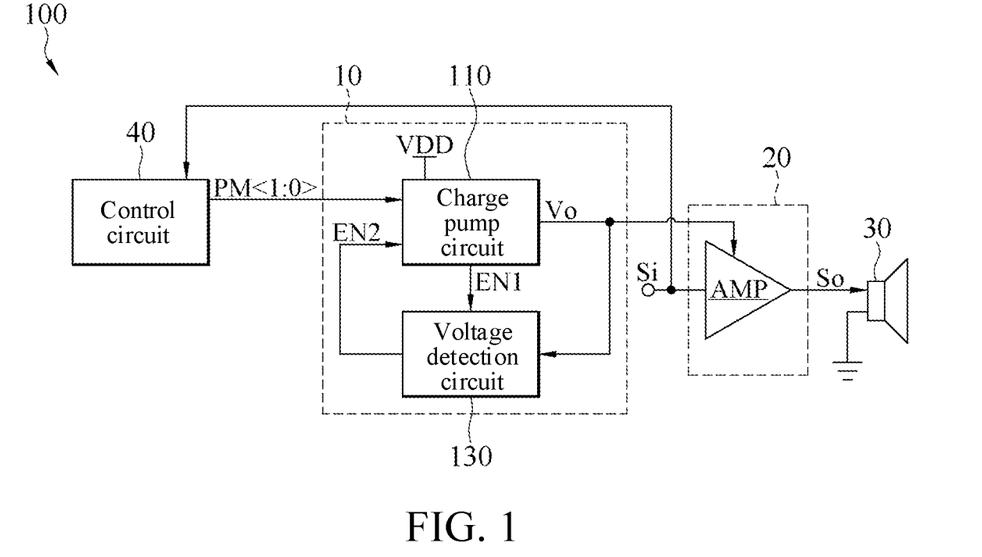
FIG. 1 is a schematic diagram of a voltage modulation circuit according to an embodiment.

Referring to FIG. 1, a voltage modulation circuit 10 includes a charge pump circuit 110 and a voltage detection circuit 130. The charge pump circuit 110 is coupled to the voltage detection circuit 130.

The charge pump circuit 110 supports a plurality of power supply modes with different conversion rates. Herein, the charge pump circuit 110 performs a power supply operation in one (hereinafter referred to as a selected power supply mode) of the power supply modes according to a control signal PM <1:0>, to convert a power supply voltage VDD into at least one output voltage Vo for supplying power to a post-stage circuit 20.

In addition, when switching of the selected power supply mode meets a specific condition, the charge pump circuit 110 outputs a wake-up signal (for example, a high-level control signal EN1) to the voltage detection circuit 130. Herein, the wake-up signal is used for activating the voltage detection circuit 130.

In other words, the voltage detection circuit 130 is activated by the wake-up signal (for example, the high-level control signal EN1). After being activated, the voltage detection circuit 130 receives and detects the output voltage Vo, and suspends the power supply operation of the charge pump circuit 110 according to a magnitude of the output voltage Vo.

In some embodiments, when the power supply operation of the charge pump circuit 110 is suspended (that is, the charge pump circuit 110 is in a supply suspension mode), the post-stage circuit 20 proactively draws current from the charge pump circuit 110, so as to make the output voltage Vo of the charge pump circuit 110 change slowly. In an example, the post-stage circuit 20 is an audio amplifier circuit. The audio amplifier circuit proactively draws current from the charge pump circuit 110 in the supply suspension mode, so that the output voltage Vo of the charge pump circuit 110 changes slowly and the audio amplifier circuit driven by the charge pump circuit 110 does not generate pop noise.

In some embodiments, a quantity of output voltages Vo outputted by the charge pump circuit 110 may be designed according to a quantity of power supplies required by the post-stage circuit 20. In an example, the charge pump circuit 110 may provide a single output voltage Vo (for example, a single positive output voltage or a single negative output voltage) for the post-stage circuit 20. In some examples, the charge pump circuit 110 may alternatively provide two output voltages Vo (for example, a positive output voltage VPP and a negative output voltage VEE shown in FIG. 2, or two positive output voltages) for the post-stage circuit 20. In some examples, the charge pump circuit 110 may alternatively provide three or more output voltages Vo for the post-stage circuit 20.

Figure 2:
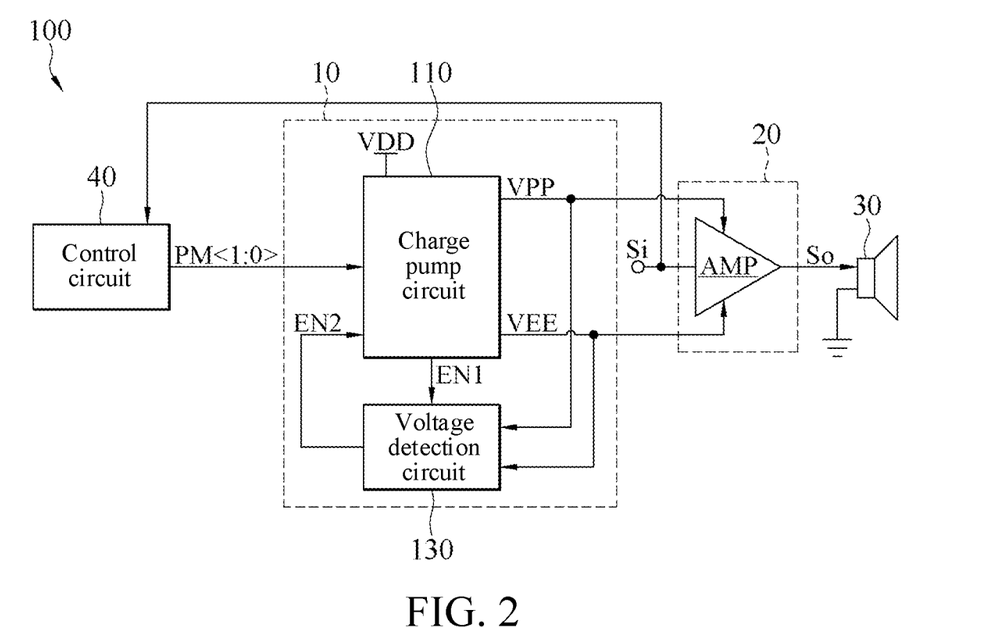
FIG. 2 is a schematic diagram of a voltage modulation circuit according to another embodiment.

In some embodiments, referring to FIG. 1 or FIG. 2, the control signal PM <1:0> may be generated by a control circuit 40 according to an amplitude of a signal (for example, an input signal Si or an output signal So) of the post-stage circuit 20. In other words, the control circuit 40 determines, according to the amplitude of the signal of the post-stage circuit 20, a power supply mode to be executed by the charge pump circuit 110. That is, the control circuit 40 generates the corresponding control signal PM <1:0> according to the amplitude of the signal of the post-stage circuit 20. Herein, an implementation structure and an operation principle of the control circuit 40 are well known to a person skilled in the art. Therefore, details are not described herein again.

In an example, referring to FIG. 1 or FIG. 2, the post-stage circuit 20 is an amplifier circuit (for example, an audio amplifier circuit). The charge pump circuit 110 supplies power to the amplifier circuit, so that the amplifier circuit can operate. During operation, the amplifier circuit generates the output signal So according to the input signal Si to drive a load 30 (for example, a speaker or a headset). For example, the amplifier circuit may include an amplifier (AMP). A power end of the AMP is coupled to an output end of the charge pump circuit 110, and is supplied with the output voltage Vo (or the positive output voltage VPP and the negative output voltage VEE) from the output end of the charge pump circuit 110 as the power required for operation. Under the power supply of the charge pump circuit 110, the AMP amplifies the input signal Si into the output signal So and provides the output signal So for the load 30.

Referring to FIG. 1 or FIG. 2, the control circuit 40 is coupled to an input or an output end of the amplifier circuit. During operation, the control circuit 40 detects the input signal Si or the output signal So of the amplifier circuit and generates the control signal PM <1:0> according to the amplitude of the input signal Si or the amplitude of the output signal So. It should be understood that although FIG. 1 illustrates that the control signal PM <1:0> is generated according to the input signal Si, the control signal PM <1:0> may alternatively be generated according to the output signal So according to an actual requirement.

The following description takes that, the charge pump circuit 110 provides two output voltages (that is, the positive output voltage VPP and the negative output voltage VEE), as an example.

In some embodiments, referring to FIG. 2, the charge pump circuit 110 has three power supply modes with different conversion rates. In addition, in the three power supply modes, the output voltages (that is, voltage differences between the positive output voltage VPP and the negative output voltage VEE) outputted by the charge pump circuit 110 are three different multiples of the power supply voltage VDD. For example, the three power supply modes are respectively referred to as a high supply mode, a medium supply mode, and a low supply mode. In the high supply mode, the charge pump circuit 110 generates a positive output voltage VPP of +VDD and a negative output voltage VEE of −VDD. In the medium supply mode, the charge pump circuit 110 generates a positive output voltage VPP of +VDD/2 and a negative output voltage VEE of −VDD/2. In the low supply mode, the charge pump circuit 110 generates a positive output voltage VPP of +VDD/3 and a negative output voltage VEE of −VDD/3. Therefore, the control circuit 40 may generate the control signal PM <1:0> according to a power level (e.g. a range of voltage value of the input signal Si or the output signal So within a preset time period) required by the post-stage circuit 20, to control the power supply mode used by the charge pump circuit 110.

In some embodiments, the control signal PM <1:0> may be a digital signal. For example, PM <1:0>=00 represents the low supply mode, PM <1:0>=01 represents the medium supply mode, and PM <1:0>=10 or 11 represents the high supply mode. In other words, the charge pump circuit 110 performs the power supply operation in the low supply mode in response to the control signal PM <1:0> of "00". The charge pump circuit 110 performs the power supply operation in the medium supply mode in response to the control signal PM <1:0> of "01". The charge pump circuit 110 performs the power supply operation in the high supply mode in response to the control signal PM <1:0> of "10" or "11".

In some embodiments, the specific condition is that the selected power supply mode is switched from one of the power supply modes to another one of the power supply modes. In an example, the specific condition may be that the selected power supply mode is switched from a power supply mode with a large conversion rate to a power supply mode with a small conversion rate. In another example, the specific condition may be that the selected power supply mode is switched from a specific power supply mode to another specific power supply mode. For example, in the previous example, the charge pump circuit 110 may have a high supply mode, a medium supply mode, and a low supply mode with different and successively decreasing conversion rates. Herein, the specific condition may be that the selected power supply mode is switched from the high supply mode to the medium supply mode.

Figure 3:
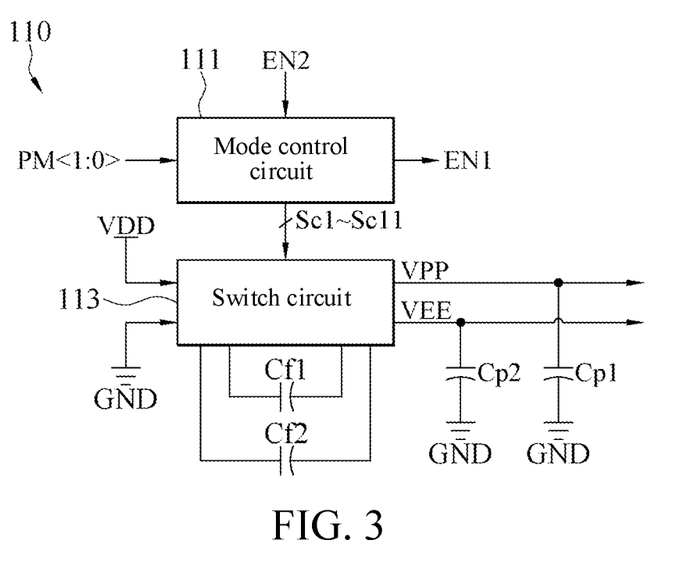
FIG. 3 is a schematic diagram of an example of a charge pump circuit in FIG. 2.

In some embodiments, referring to FIG. 2 and FIG. 3, the charge pump circuit 110 includes a mode control circuit 111 and a power supply circuit, and the power supply circuit includes a first storage capacitor Cp1, a second storage capacitor Cp2, a first flying capacitor Cf1, a second flying capacitor Cf2, and a switch circuit 113. The mode control circuit 111 is coupled to control end(s) of the switch circuit 113. The first storage capacitor Cp1 is coupled between a positive output end (that is, the positive output end is configured to output the positive output voltage VPP) of the switch circuit 113 and a ground GND. The second storage capacitor Cp2 is coupled between a negative output end (that is, the negative output end is configured to output the negative output voltage VEE) of the switch circuit 113 and the ground GND. The first flying capacitor Cf1 is connected between two contact ends of the switch circuit 113 and the second flying capacitor Cf2 is connected between another two contact ends of the switch circuit 113. In addition, the switch circuit 113 is further coupled between the power supply voltage VDD and the ground GND.

Herein, the mode control circuit 111 generates a plurality of switch signals Sc1 to Sc11 corresponding to the selected power supply mode according to the control signal PM <1:0>, and the mode control circuit 111 further outputs the wake-up signal to the voltage detection circuit 130 when the switching of the selected power supply mode meets the specific condition. The switch circuit 113 controls an electrical connection relationship between the power supply voltage VDD, the first storage capacitor Cp1, the second storage capacitor Cp2, the first flying capacitor Cf1, the second flying capacitor Cf2, and the ground GND according to the switch signals Sc1 to Sc11, to output the positive output voltage VPP and the negative output voltage VEE corresponding to the selected power supply mode.

Figure 4:
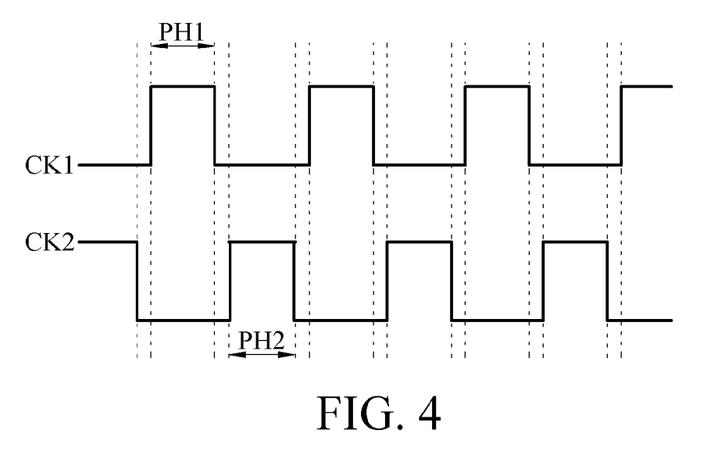
FIG. 4 is a sequence diagram of an example of a control signal in FIG. 2 in a selected power supply mode.

In some embodiments, the mode control circuit 111 may include a clock generator (not shown). As shown in FIG. 4, the clock generator generates a first clock CK1 and a second clock CK2 through a non-overlapped modulation technology, and provides a first phase PH1 and a second phase PH2 according to the first clock CK1 and the second clock CK2. Herein, the first phase PH1 of the first clock CK1 is not overlapped with the second phase PH2 of the second clock CK2. An implementation structure and an operation principle of a clock generator are well known to a person skilled in the art. Therefore, details are not described herein again.

In addition, the mode control circuit 111 may further include a signal output circuit (not shown), and the signal output circuit adjusts the first clock CK1 and the second clock CK2 according to the control signal PM <1:0> to control the switch circuit 113. In other words, the signal output circuit generates the switch signals Sc1 to Sc11 corresponding to the selected power supply mode according to the control signal PM <1:0> by using the first clock CK1 and the second clock CK2. The signal output circuit may be implemented by using one or more multiplexers.

In some embodiments, referring to FIG. 2 to FIG. 5, the switch circuit 113 includes a plurality of switches (for example, Sw1 to Sw11 shown in the figure). The switches Sw1 to Sw11 are connected to between any two of the power supply voltage VDD, the ground GND, the positive output end N1, the power voltage output end N2, a positive electrode of the first flying capacitor Cf1, a negative electrode of the first flying capacitor Cf1, a positive electrode of the second flying capacitor Cf2, and a negative electrode of the second flying capacitor Cf2. The positive output end N1 and the negative output end N2 are externally coupled to the post-stage circuit 20. Herein, the mode control circuit 111 is coupled to control ends of the switches Sw1 to Sw11, so that the switch signals Sc1 to Sc11 outputted by the mode control circuit 111 are respectively used for controlling the switches Sw1 to Sw11.

Figure 5:
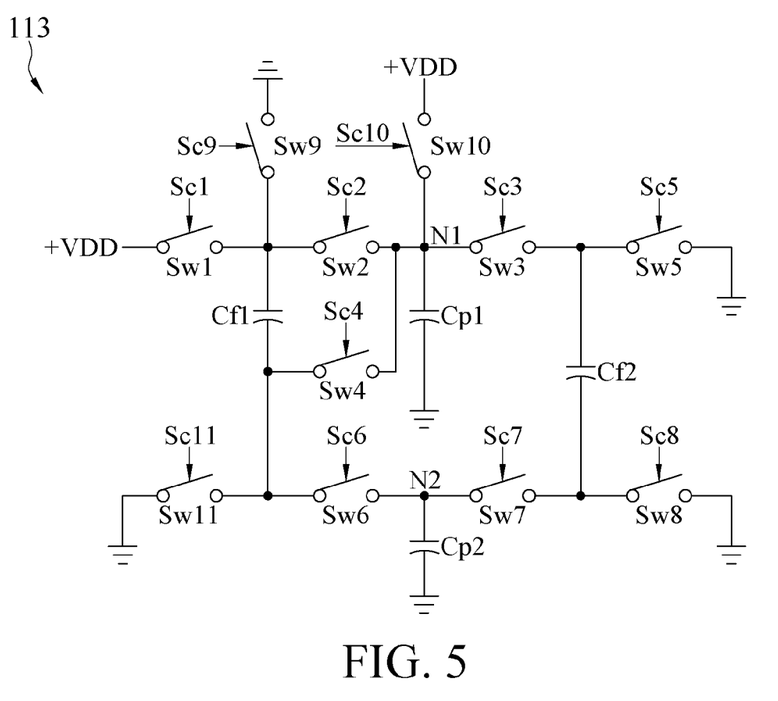
FIG. 5 is a schematic diagram of an example of a switch circuit in FIG. 3.

In the low supply mode, the mode control circuit 111 uses the first clock CK1 as the switch signals Sc1, Sc3, Sc4, and Sc8, and respectively inputs the switch signals Sc1, Sc3, Sc4, and Sc8 into the control ends of the switches Sw1, Sw3, Sw4, and Sw8. In addition, the mode control circuit 111 uses the second clock CK2 as the switch signals Sc2, Sc5, Sc6, and Sc7, and respectively inputs the switch signals Sc2, Sc5, Sc6, and Sc7 into the control ends of the switches Sw2, Sw5, Sw6, and Sw7. The control ends of the switches Sw9, Sw10, and Sw11 do not receive any control signal, so that the switches Sw9, Sw10, and Sw11 keep being off at the first phase PH1 and the second phase PH2. That is, in the low supply mode, the switch Sw1 to the switch Sw8 work, and the switch Sw9 to the switch Sw11 do not work.

Figure 6:
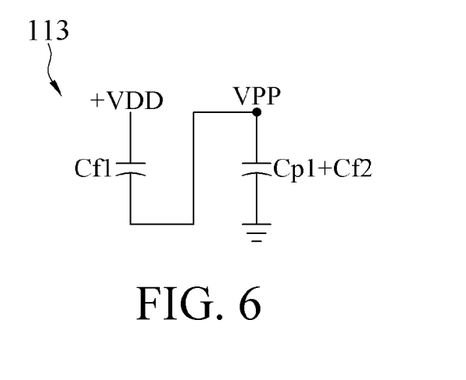
FIG. 6 is an equivalent circuit diagram of the switch circuit in FIG. 3 at a first phase in a first power supply mode.
Figure 7:
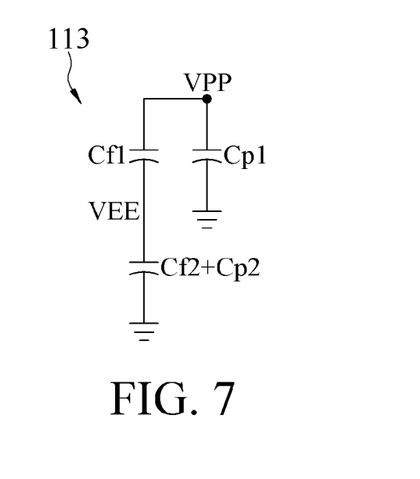
FIG. 7 is an equivalent circuit diagram of the switch circuit in FIG. 3 at a second phase in the first power supply mode.

Therefore, as shown in FIG. 6, at the first phase PH1, the switches Sw1, Sw3, Sw4, and Sw8 are on in response to the first clock CK1 (i.e. the first clock CK1 is at high level), and the switches Sw2, Sw5, Sw6, and Sw7 are off in response to the second clock CK2 (i.e. the second clock CK2 is at low level). As shown in FIG. 7, at the second phase PH2, the switches Sw1, Sw3, Sw4, and Sw8 are off in response to the first clock CK1 (i.e. the first clock CK1 is at low level), and the switches Sw2, Sw5, Sw6, and Sw7 are on in response to the second clock CK2 (i.e. the second clock CK2 is at high level). In this case, the positive output voltage VPP outputted by the positive output end N1 is (1/3) power supply voltage VDD, that is, VDD/3, and the negative output voltage VEE outputted by the negative output end N2 is (−1/3) power supply voltage VDD, that is, −VDD/3.

In the medium supply mode, the mode control circuit 111 uses the first clock CK1 as the switch signals Sc1, Sc3, Sc4, and Sc8, and respectively inputs the switch signals Sc1, Sc3, Sc4, and Sc8 into the control ends of the switches Sw1, Sw3, Sw4, and Sw8. In addition, the mode control circuit 111 uses the second clock CK2 as the switch signals Sc5, Sc6, Sc7, and Sc9, and respectively inputs the switch signals Sc5, Sc6, Sc7, and Sc9 into the control ends of the switches Sw5, Sw6, Sw7, and Sw9. The control ends of the switches Sw2, Sw10, and Sw11 do not receive any control signal, so that the switches Sw2, Sw10, and Sw11 keep being off at the first phase PH1 and the second phase PH2. That is, in the medium supply mode, the switches Sw1 and Sw3 to Sw8 work, and the switches Sw2, Sw10, and Sw11 do not work.

Figure 8:
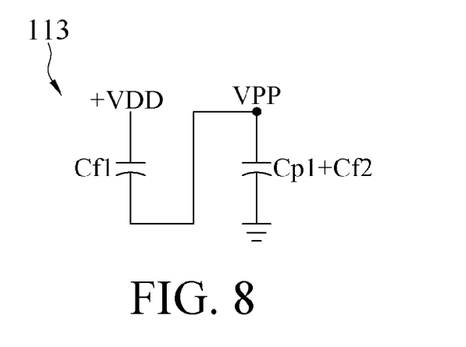
FIG. 8 is an equivalent circuit diagram of the switch circuit in FIG. 3 at a first phase in a second power supply mode.
Figure 9:
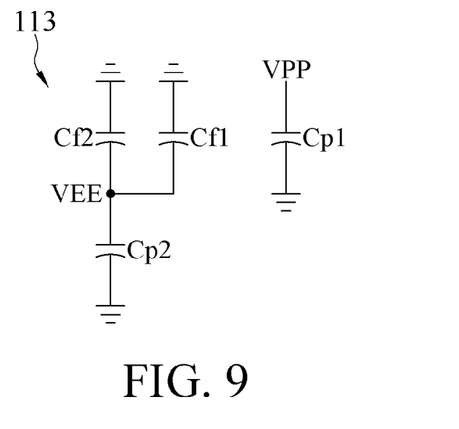
FIG. 9 is an equivalent circuit diagram of the switch circuit in FIG. 3 at a second phase in the second power supply mode.

Therefore, as shown in FIG. 8, at the first phase PH1, the switches Sw1, Sw3, Sw4, and Sw8 are on in response to the first clock CK1 (i.e. the first clock CK1 is at high level), and the switches Sw5, Sw6, Sw7, and Sw9 are off in response to the second clock CK2 (i.e. the second clock CK2 is at low level). As shown in FIG. 9, at the second phase PH2, the switches Sw1, Sw3, Sw4, and Sw8 are off in response to the first clock CK1 (i.e. the first clock CK1 is at low level), and the switches Sw5, Sw6, Sw7, and Sw9 are on in response to the second clock CK2 (i.e. the second clock CK2 is at high level). In this case, the positive output voltage VPP outputted by the positive output end N1 is a (1/2) power supply voltage VDD, that is, VDD/2, and the negative output voltage VEE outputted by the negative output end N2 is a (−1/2) power supply voltage VDD, that is, −VDD/2.

In the high supply mode, the mode control circuit 111 uses the first clock CK1 as the switch signals Sc1, Sc3, Sc8, Sc10, and Sc11, and respectively inputs the switch signals Sc1, Sc3, Sc8, Sc10, and Sc11 into the control ends of the switches Sw1, Sw3, Sw8, Sw10, and Sw11. In addition, the mode control circuit 111 uses the second clock CK2 as the switch signals Sc5, Sc6, Sc7, Sc9, and Sc10, and respectively inputs the switch signals Sc5, Sc6, Sc7, Sc9, and Sc10 into the control ends of the switches Sw5, Sw6, Sw7, Sw9, and Sw10. The control ends of the switches Sw2 and Sw4 do not receive any control signal, so that the switches Sw2 and Sw4 keep being off at the first phase PH1 and the second phase PH2. That is, in the high supply mode, the switches Sw1, Sw3, and Sw5 to Sw11 work, and the switches Sw2 and Sw4 do not work.

Figure 10:
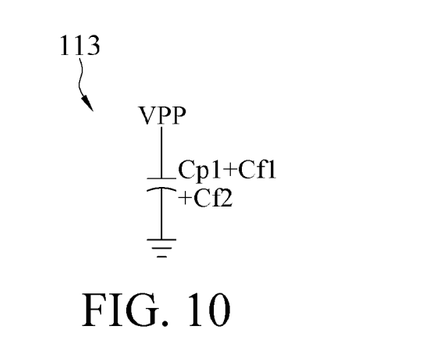
FIG. 10 is an equivalent circuit diagram of the switch circuit in FIG. 3 at a first phase in a third power supply mode.
Figure 11:
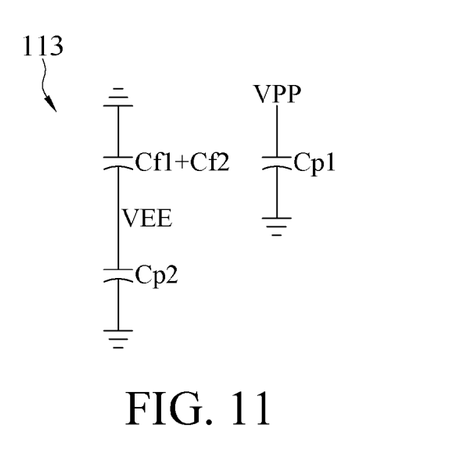
FIG. 11 is an equivalent circuit diagram of the switch circuit in FIG. 3 at a second phase in the third power supply mode.

Therefore, as shown in FIG. 10, at the first phase PH1, the switches Sw1, Sw3, Sw8, Sw10, and Sw11 are on in response to the first clock CK1 (i.e. the first clock CK1 is at high level), and the switches Sw5, Sw6, Sw7, Sw9, and Sw10 are off in response to the second clock CK2 (i.e. the second clock CK2 is at low level). As shown in FIG. 11, at the second phase PH2, the switches Sw1, Sw3, Sw8, Sw10, and Sw11 are off in response to the first clock CK1 (i.e. the first clock CK1 is at low level), and the switches Sw5, Sw6, Sw7, Sw9, and Sw10 are on in response to the second clock CK2 (i.e. the second clock CK2 is at high level). In this case, the positive output voltage VPP outputted by the positive output end N1 is a (1) power supply voltage VDD, that is, VDD, and the negative output voltage VEE outputted by the negative output end N2 is a (−1) power supply voltage VDD, that is, −VDD.

In other words, in any power supply mode, the switch circuit 113 is alternately switched between a charging connection relationship (that is, at the first phase PH1) and a pump connection relationship (that is, at the second phase PH2).

Herein, for example, the control signal PM <1:0> is a 2-bit digital signal (that is, PM <1> and PM <0> in FIG. 12), and the specific condition is that the selected power supply mode is switched from the high supply mode to the medium supply mode. PM <1:0>=00 represents the low supply mode, PM <1:0>=01 represents the medium supply mode, and PM <1:0>=10 or 11 represents the high supply mode. Referring to FIG. 2, FIG. 3, FIG. 5, and FIG. 12, when switching the selected power supply mode from the high supply mode to the medium supply mode with the control signal PM <1:0> changing from "11" to "01" (that is, the switching of the selected power supply mode meets the specific condition), the mode control circuit 111 raises a control signal EN1 outputted to the voltage detection circuit 130 from a low level to a high level (that is, the wake-up signal). The voltage detection circuit 130 is awakened by the high-level control signal EN1, and starts to detect the positive output voltage VPP and the negative output voltage VEE. When an absolute value of either the positive output voltage VPP or the negative output voltage VEE exceeds a specific threshold (or absolute values of both the positive output voltage VPP and the negative output voltage VEE exceed the specific threshold), the voltage detection circuit 130 outputs a disable signal (for example, a low-level control signal EN2) to the charge pump circuit 110. In other words, the voltage detection circuit 130 normally outputs the high-level control signal EN2 to the charge pump circuit 110. When it is detected that the absolute values and/or the absolute value of the positive output voltage VPP and/or the negative output voltage VEE exceed and/or exceeds the specific threshold, the voltage detection circuit 130 pulls down the control signal EN2 outputted to the charge pump circuit 110 from the high level to the low level (that is, the disable signal). The mode control circuit 111 receives the low-level control signal EN2 and suspends the power supply operation of the power supply circuit in response to the low-level control signal EN2, that is, stops to control the switch circuit 113 to be alternately switched between the connection relationship at the first phase PH1 and the connection relationship at the second phase PH2. When the charge pump circuit 110 suspends the power supply operation, the switch circuit 113 presents a specific connection relationship. Until the voltage detection circuit 130 detects that neither the absolute value of the positive output voltage VPP nor the absolute value of the negative output voltage VEE exceeds the specific threshold (or the absolute value of either the positive output voltage VPP or the negative output voltage VEE does not exceed the specific threshold), the voltage detection circuit 130 raises the control signal EN2 outputted to the charge pump circuit 110 from the low level to the high level (that is, the voltage detection circuit 130 does not output disable signal), so that the charge pump circuit 110 is restored to perform the power supply operation in the medium supply mode (that is, the selected power supply mode) in response to the high-level control signal EN2 (that is, the mode control circuit 111 is restored to output the switch signals Sc1, Sc3, Sc4, Sc5, Sc6, Sc7, Sc8, and Sc9 corresponding to the medium supply mode in response to the high-level control signal EN2).

In some embodiments, the specific connection relationship may be that the switch circuit 113 keeps being disconnected from the power supply voltage VDD.

In some embodiments, the specific connection relationship may be that the switch circuit 113 keeps being disconnected from the power supply voltage VDD and maintains the electrical connection of the first storage capacitor Cp1, the second storage capacitor Cp2, the first flying capacitor Cf1, and the second flying capacitor Cf2 to the post-stage circuit 20.

Figure 12:
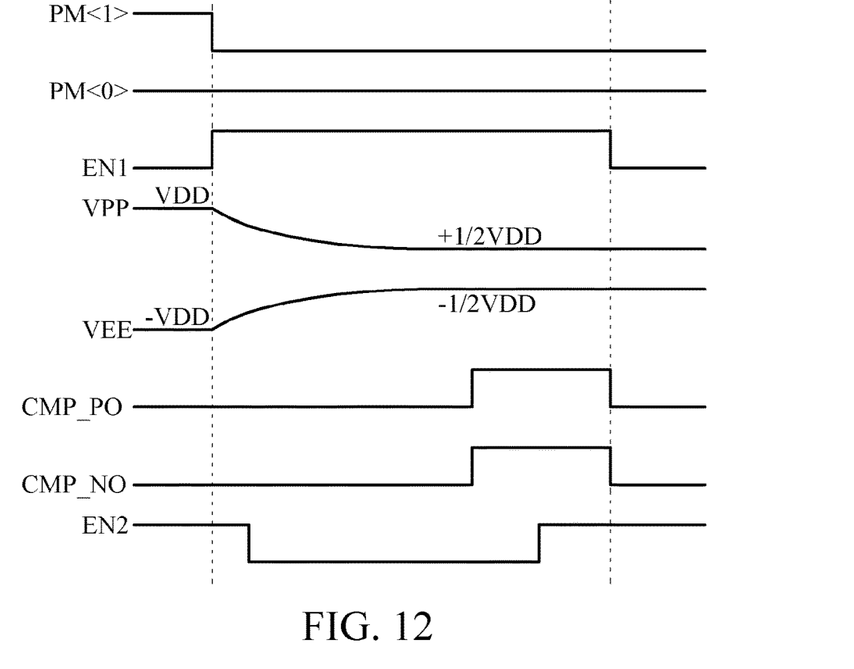
FIG. 12 is a sequence diagram of signals in a selected power supply mode.

In some embodiments, the specific connection relationship may be equivalent to that the switch circuit 113 is maintained under the control at the second phase PH2 in the selected power supply mode. For example, in the previous example, in the supply suspension mode, the mode control circuit 111 outputs the switch signals Sc5, Sc6, Sc7, and Sc9 maintained at the high level to the control ends of the switches Sw5, Sw6, Sw7, and Sw9. The control ends of the switches Sw1, Sw2, Sw3, Sw4, Sw8, Sw10, and Sw11 do not receive any control signal or receive the switch signals Sc1, Sc2, Sc3, Sc4, Sc8, Sc10, and Sc11 that are outputted by the mode control circuit 111 and that are maintained at the low level. Therefore, as shown in FIG. 9, the switches Sw1, Sw2, Sw3, Sw4, Sw8, Sw10, and Sw11 keep being off, and the switches Sw5, Sw6, Sw7, and Sw9 keep being on. In other words, the switch circuit 113 maintains an on/off state at the second phase PH2 in the medium supply mode, that is, the first storage capacitor Cp1 is coupled between the positive output end N1 and the ground GND, and the second storage capacitor Cp2, the first flying capacitor Cf1, and the second flying capacitor Cf2 are individually coupled between the negative output end N2 and the ground GND. In this case, as shown in FIG. 12, the post-stage circuit 20 draws current from the power supply circuit by the positive output end N1 and the negative output end N2. To be specific, charges on all capacitors (that is, the first storage capacitor Cp1, the second storage capacitor Cp2, the first flying capacitor Cf1, and the second flying capacitor Cf2) of the charge pump circuit 110 decrease over time and are successively provided to the post-stage circuit 20, so that an electric potential of the positive output voltage VPP continuously decrease due to the post-stage circuit 20 and an electric potential of the negative output voltage VEE continuously increase due to the post-stage circuit 20.

Figure 13:
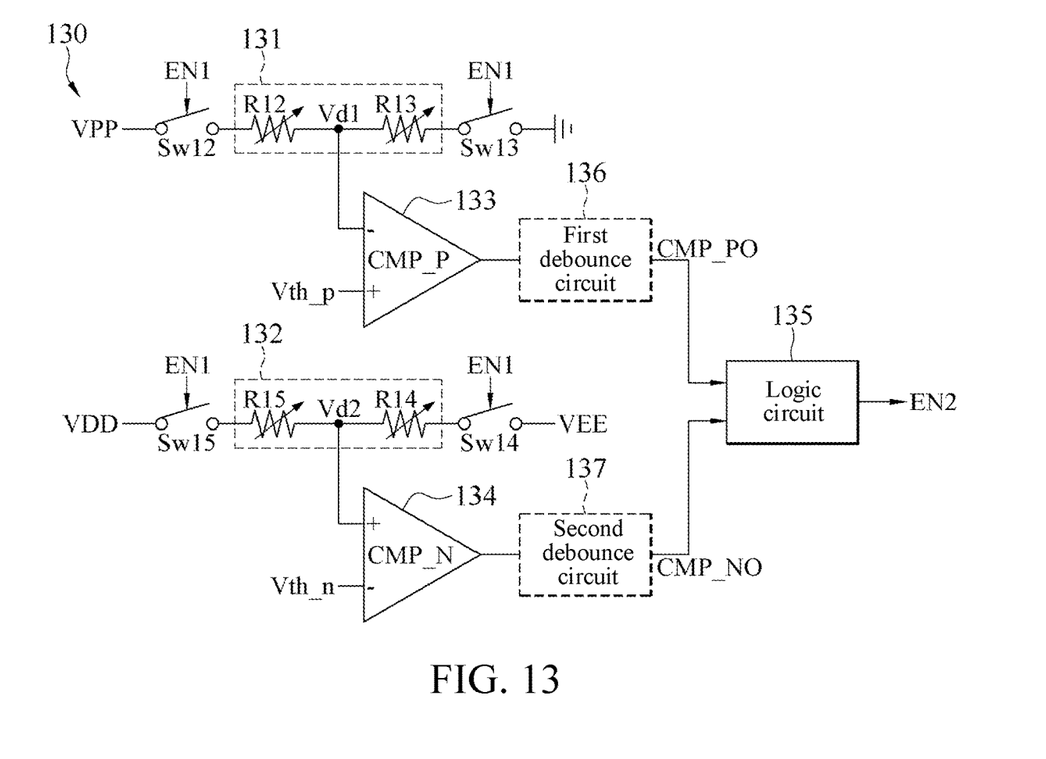
FIG. 13 is a schematic diagram of an example of a voltage detection circuit in FIG. 2.

In an embodiment, referring to FIG. 13, the voltage detection circuit 130 includes a plurality of switches (for example, a first switch Sw12 and a second switch Sw14), a plurality of division circuits (for example, a first division circuit 131 and a second division circuit 132), a plurality of comparators (for example, a first comparator 133 and a second comparator 134), and a logic circuit 135. The first switch Sw12 is coupled between a first end of the first division circuit 131 and the positive output voltage VPP of the charge pump circuit 110. The second switch Sw14 is coupled between a first end of the second division circuit 132 and the negative output voltage VEE of the charge pump circuit 110. A positive input end of the first comparator 133 is coupled to a voltage dividing point of the first division circuit 131, and a negative input end of the first comparator 133 is coupled to a first reference voltage Vth_p. A positive input end of the second comparator 134 is coupled to a voltage dividing point of the second division circuit 132, and a negative input end of the second comparator 134 is coupled to a second reference voltage Vth_n. An output end of the first comparator 133 and an output end of the second comparator 134 are coupled to the logic circuit 135.

The first switch Sw12 and the second switch Sw14 are normally in an off state. A control end of the first switch Sw12 and a control end of the second switch Sw14 receive the wake-up signal (for example, the high-level control signal EN1), so that the first switch Sw12 and the second switch Sw14 are turned on in response to the wake-up signal (for example, the high-level control signal EN1).

When the first switch Sw12 is turned on, the first division circuit 131 receives the positive output voltage VPP through the first switch Sw12 and generates a first divided voltage Vd1 by using the positive output voltage VPP. In other words, the first divided voltage Vd1 is related to the positive output voltage VPP. In an example, the positive output voltage VPP is directly proportional to the first divided voltage Vd1. For example, the positive output voltage VPP is a first specific multiple of the first divided voltage Vd1.

The first comparator 133 compares the first divided voltage Vd1 with the first reference voltage Vth_p, to generate a first comparison result.

When the second switch Sw14 is turned on, the second division circuit 132 receives the negative output voltage VEE through the second switch Sw14 and generates a second divided voltage Vd2 by using the negative output voltage VEE. In other words, the second divided voltage Vd2 is related to the negative output voltage VEE. In an example, the negative output voltage VEE is directly proportional to the second divided voltage Vd2. For example, the negative output voltage VEE is a second specific multiple of the second divided voltage Vd2.

The second comparator 134 compares the second divided voltage Vd2 with the second reference voltage Vth_n, to generate a second comparison result.

The logic circuit 135 controls, according to the first comparison result and the second comparison result, the charge pump circuit 110 to supply power in a specific power supply mode temporarily.

In some embodiments, an ideal value of the positive output voltage VPP is the first specific multiple of an absolute value of the first reference voltage Vth_p. An ideal value of the negative output voltage VEE is the second specific multiple of an absolute value of the second reference voltage Vth_n. In an example, values of the first reference voltage Vth_p and the second reference voltage Vth_n may be the same. In another example, values of the first reference voltage Vth_p and the second reference voltage Vth_n may be different.

In some embodiments, a second end of the first division circuit 131 may be coupled to the ground GND through a third switch Sw13. The third switch Sw13 is also normally in an off state. When the voltage detection circuit 130 receives the wake-up signal (for example, the high-level control signal EN1), the first switch Sw12 and the third switch Sw13 are switched to be turned on in response to the wake-up signal (for example, the high-level control signal EN1), so that the first division circuit 131 obtains the first divided voltage Vd1 between the positive output voltage VPP and 0 V (that is, a voltage of the ground GND). Similarly, a second end of the second division circuit 132 may be coupled to the power supply voltage VDD through a fourth switch Sw15. The fourth switch Sw15 is also normally in an off state. When the voltage detection circuit 130 receives the wake-up signal (for example, the high-level control signal EN1), the second switch Sw14 and the fourth switch Sw15 are switched to be turned on in response to the wake-up signal (for example, the high-level control signal EN1), so that the second division circuit 132 obtains the second divided voltage Vd2 between the power supply voltage VDD and the negative output voltage VEE.

In some embodiments, a first debounce circuit 136 may be coupled between the first comparator 133 and the logic circuit 135. Therefore, the first comparison result generated by the first comparator 133 is processed by the first debounce circuit 136 (that is, a processed signal CMP_PO), and then is inputted into the logic circuit 135. Similarly, a second debounce circuit 137 may be coupled between the second comparator 134 and the logic circuit 135. Therefore, the second comparison result generated by the second comparator 134 is processed by the second debounce circuit 137 (that is, a processed signal CMP_NO), and then is inputted into the logic circuit 135. Herein, FIG. 12 is a sequence diagram of the control signal PM <1:0>, the control signal EN1, the positive output voltage VPP, the negative output voltage VEE, the signal CMP_PO, the signal CMP_NO, and the control signal EN2.

In an example, referring to FIG. 12 and FIG. 13, the logic circuit 135 may be an OR gate. When the first divided voltage Vd1 is higher than the first reference voltage Vth_p, the first comparison result outputted by the first comparator 133 is a low level (that is, the signal CMP-PO is in the low level). When the second divided voltage Vd2 is lower than the second reference voltage Vth_n, the second comparison result outputted by the second comparator 134 is a low level (that is, the signal CMP_NO is in the low level). In the case, the OR gate (135) outputs a disable signal (for example, outputs the low-level control signal EN2) in response to the low-level signal CMP_PO and the low-level signal CMP_NO, to suspend the POWER supply operation of the charge pump circuit 110. When the first reference voltage Vth_p is higher than the first divided voltage Vd1, the first comparison result outputted by the first comparator 133 is a high level (that is, the signal CMP-PO is in the high level). When the second divided voltage Vd2 is higher than the second reference voltage Vth_n, the second comparison result outputted by the second comparator 134 is a high level (that is, the signal CMP_NO is in the high level). Herein, the OR gate (135) stops outputting the disable signal (for example, outputs the high-level control signal EN2 instead of the low-level control signal EN2) in response to the high-level signal CMP_PO or the high-level signal CMP_NO. In this case, the charge pump circuit 110 is restored to supply power in the selected power supply mode. In other words, the operation of the voltage detection circuit 130 is equivalent to detecting whether the absolute value of the positive output voltage VPP and the absolute value of the negative output voltage VEE exceed the specific threshold. When both the absolute value of the positive output voltage VPP and the absolute value of the negative output voltage VEE exceed the specific threshold, the voltage detection circuit 130 outputs the disable signal to the charge pump circuit 110. Conversely, when the absolute value of either the positive output voltage VPP or the negative output voltage VEE does not exceed the specific threshold, the voltage detection circuit 130 does not output the disable signal to the charge pump circuit 110.

In another example, the logic circuit 135 may be an AND gate. When the first divided voltage Vd1 is higher than the first reference voltage Vth_p. (that is, the first comparison result outputted by the first comparator 133 is the low level) or the second divided voltage Vd2 is lower than the second reference voltage Vth_n (that is, the second comparison result outputted by the second comparator 134 is the low level), the AND gate (135) outputs a disable signal (for example, the low-level control signal EN2), to suspend the power supply operation of the charge pump circuit 110. When the first divided voltage Vd1 is lower than the first reference voltage Vth_p. (that is, the first comparison result outputted by the first comparator 133 is the high level) and the second divided voltage Vd2 is higher than the second reference voltage Vth_n (that is, the second comparison result outputted by the second comparator 134 is the high level), the AND gate (135) stops outputting the disable signal (for example, outputs the high-level control signal EN2 instead of the low-level control signal EN2). In this case, the charge pump circuit 110 is restored to perform the power supply operation in the selected power supply mode. In other words, the operation of the voltage detection circuit 130 is equivalent to detecting whether the absolute value of either the positive output voltage VPP or the negative output voltage VEE exceeds the specific threshold. When the absolute value of at least one of the positive output voltage VPP and the negative output voltage VEE exceeds the specific threshold, the voltage detection circuit 130 outputs the disable signal to the charge pump circuit 110. Conversely, when neither the absolute value of the positive output voltage VPP nor the absolute value of the negative output voltage VEE exceeds the specific threshold, the voltage detection circuit 130 does not output the disable signal to the charge pump circuit 110.

In some embodiments, the first division circuit 131 may be implemented by a serial circuit of a plurality of resistors R12 and R13. Herein, a contact between the plurality of resistors R12 and R13 is the voltage dividing point of the first division circuit 131. Similarly, the second division circuit 132 may also be implemented by a serial circuit of a plurality of resistor R14 and R15. Herein, a contact between the plurality of resistors R14 and R15 is the voltage dividing point of the second division circuit 132. In some embodiments, the resistors R12, R13, R14, and R15 may be fixed resistance resistors, or variable resistance resistors. The voltage detection circuit 130 may adjust detection sensitivity by adjusting resistances of the resistors R12, R13, R14, and R15.

Figure 14:
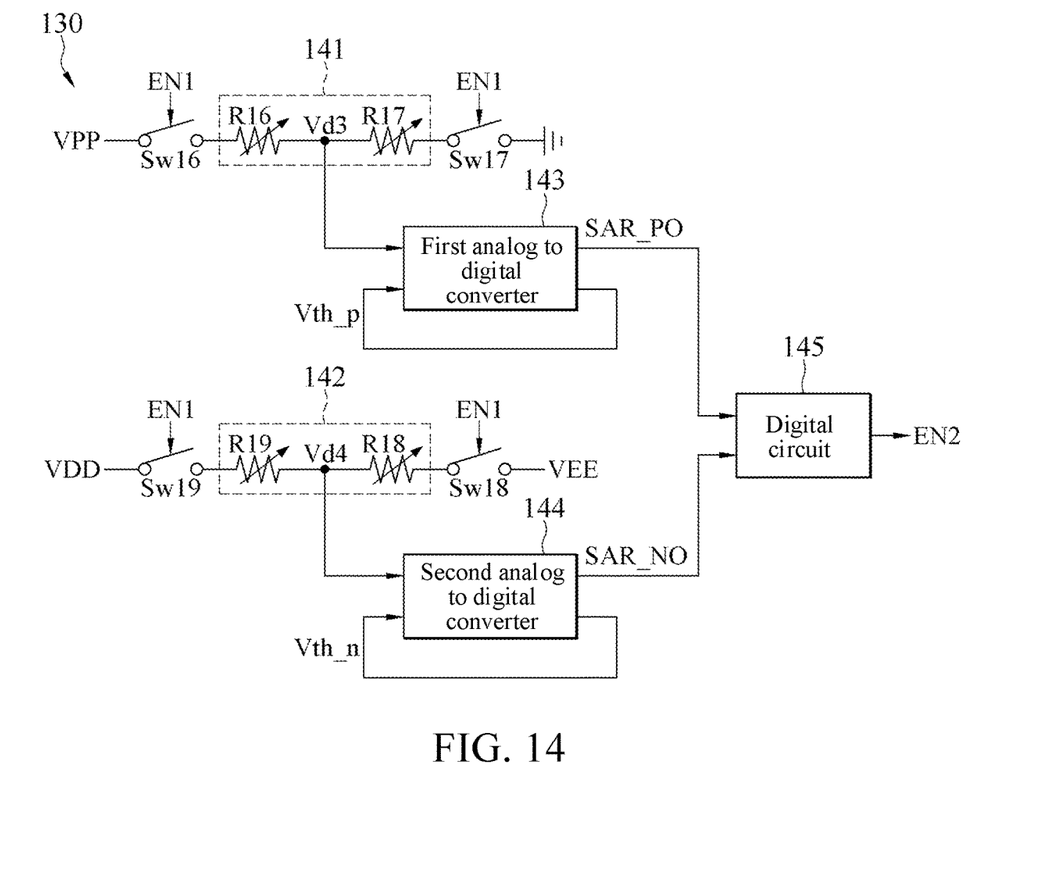
FIG. 14 is a schematic diagram of another example of a voltage detection circuit in FIG. 2.

In another embodiment, referring to FIG. 14, the voltage detection circuit 130 includes a plurality of switches (for example, a first switch Sw16 and a second switch Sw18), a plurality of division circuits (for example, first division circuit 141 and a second division circuit 142), a plurality of analog to digital converters (for example, a first analog to digital converter 143 and a second analog to digital converter 144), and a digital circuit 145. The first switch Sw16 is coupled between a first end of the first division circuit 141 and the positive output voltage VPP of the charge pump circuit 110. The second switch Sw18 is coupled between a first end of the second division circuit 142 and the negative output voltage VEE of the charge pump circuit 110. A first input end of the first analog to digital converter 143 is coupled to a voltage dividing point of the first division circuit 141, and a second input end of the first analog to digital converter 143 is coupled to the first reference voltage Vth_p. A first input end of the second analog to digital converter 144 is coupled to a voltage dividing point of the second division circuit 142, and a second input end of the second analog to digital converter 144 is coupled to the second reference voltage Vth_n. An output end of the first analog to digital converter 143 and an output end of the second analog to digital converter 144 are coupled to the digital circuit 145.

The first switch Sw16 and the second switch Sw18 are normally in an off state. A control end of the first switch Sw16 and a control end of the second switch Sw18 receive the wake-up signal (for example, the high-level control signal EN1), so that the first switch Sw16 and the second switch Sw18 are turned on in response to the wake-up signal (for example, the high-level control signal EN1).

When the first switch Sw16 is turned on, the first division circuit 141 receives the positive output voltage VPP through the first switch Sw16 and generates a first divided voltage Vd3 by using the positive output voltage VPP. In other words, the first divided voltage Vd3 is related to the positive output voltage VPP. In an example, the positive output voltage VPP is directly proportional to the first divided voltage Vd3. For example, the positive output voltage VPP is a third specific multiple of the first divided voltage Vd3.

The first analog to digital converter 143 generates a first digital signal SAR_PO corresponding to the positive output voltage VPP according to the first divided voltage Vd3 and the first reference voltage Vth_p. In an embodiment, the first analog to digital converter 143 may be implemented by a successive-approximation analog to digital converter (SAR ADC). Herein, the first analog to digital converter 143 samples the first divided voltage Vd3 and compares the sampled first divided voltage Vd3 with the first reference voltage Vth_p with reference to a high-speed clock, and corrects the first reference voltage Vth_p according to a comparison result, so that the first reference voltage Vth_p successively approaches the first divided voltage Vd3, and a value of the first divided voltage Vd3 is detected within a short period of time and is converted into a digital code (that is, the first digital signal SAR_PO).

When the second switch Sw18 is turned on, the second division circuit 142 receives the negative output voltage VEE through the second switch Sw18 and generates a second divided voltage Vd4 by using the negative output voltage VEE. In other words, the second divided voltage Vd4 is related to the negative output voltage VEE. In an example, the negative output voltage VEE is directly proportional to the second divided voltage Vd4. For example, the negative output voltage VEE is a fourth specific multiple of the second divided voltage Vd4.

The second analog to digital converter 144 generates a second digital signal SAR NO corresponding to the negative output voltage VEE according to the second divided voltage Vd4 and the second reference voltage Vth_n. In an embodiment, the second analog to digital converter 144 may also be implemented by the SAR ADC. Herein, the second analog to digital converter 144 samples the second divided voltage Vd4 and compares the sampled second divided voltage Vd4 with the second reference voltage Vth_n with reference to a high-speed clock, and corrects the second reference voltage Vth_n according to a comparison result, so that the second reference voltage Vth_n successively approaches the second divided voltage Vd4, and a value of the second divided voltage Vd4 is detected within a short period of time and is converted into a digital code (that is, the second digital signal SAR NO).

The digital circuit 145 then controls, according to the first digital signal SAR_PO and the second digital signal SAR NO, the charge pump circuit 110 to supply power in a specific power supply mode temporarily. In other words, the digital circuit 145 may determine whether to restart the charge pump circuit 110 according to whether the first digital signal SAR_PO and the second digital signal SAR NO reach a predetermined code. For example, when the first digital signal SAR_PO and/or the second digital signal SAR NO exceed and/or exceeds the predetermined code, the digital circuit 145 outputs a disable signal (for example, the low-level control signal EN2) to the charge pump circuit 110. When the charge pump circuit 110 suspends performing the power supply operation in the selected power supply mode in response to the disable signal (for example, the low-level control signal EN2), a post-stage circuit 20 (for example, an amplifier circuit) of the charge pump circuit 110 can proactively draw current to make the positive output voltage VPP and the negative output voltage VEE change slowly. Conversely, when both the first digital signal SAR_PO and the second digital signal SAR NO meet or do not exceed the predetermined code, the voltage detection circuit 130 does not output the disable signal (for example, outputs the high-level control signal EN2 instead of the low-level control signal EN2) to the charge pump circuit 110.

In other words, the operation of the voltage detection circuit 130 is equivalent to detecting whether the absolute value of either the positive output voltage VPP or the negative output voltage VEE exceeds the specific threshold (corresponding to the predetermined code).

In some embodiments, a second end of the first division circuit 141 may be coupled to the ground GND through a third switch Sw17. The third switch Sw17 is also normally in an off state. When the voltage detection circuit 130 receives the wake-up signal (for example, the high-level control signal EN1), the first switch Sw16 and the third switch Sw17 are switched to be turned on in response to the wake-up signal (for example, the high-level control signal EN1), so that the first division circuit 141 obtains the first divided voltage Vd3 between the positive output voltage VPP and 0 V (that is, the voltage of the ground GND). Similarly, a second end of the second division circuit 142 may be coupled to the power supply voltage VDD through a fourth switch Sw19. The fourth switch Sw19 is also normally in an off state. When the voltage detection circuit 130 receives a wake-up signal (for example, a high-level control signal EN1), the second switch Sw18 and the fourth switch Sw19 are switched to be turned on in response to the wake-up signal (for example, the high-level control signal EN1), so that the second division circuit 142 obtains the second divided voltage Vd4 between the power supply voltage VDD and the negative output voltage VEE.

In some embodiments, the first division circuit 141 may be implemented by a serial circuit of a plurality of resistors R16 and R17. Herein, a contact between the plurality of resistors R16 and R17 is the voltage dividing point of the first division circuit 141. Similarly, the second division circuit 142 may also be implemented by a serial circuit of a plurality of resistor R18 and R19. Herein, a contact between the plurality of resistors R18 and R19 is the voltage dividing point of the second division circuit 142. In some embodiments, the resistors R16, R17, R18, and R19 may be fixed resistance resistors, or variable resistance resistors. The voltage detection circuit 130 may adjust detection sensitivity by adjusting resistances of the resistors R16, R17, R18, and R19.

In some embodiments, when the charge pump circuit 110 is restored to perform the power supply operation in the selected power supply mode from the power supply suspension mode, the voltage detection circuit 130 switches from a working state to an off state. For example, when the charge pump circuit 110 is restored to perform the power supply operation in the selected power supply mode from the power supply suspension mode, the mode control circuit 111 stops outputting a wake-up signal (for example, outputs the low-level control signal EN1 instead of the high-level control signal EN1) to the voltage detection circuit 130, so that the voltage detection circuit 130 returns to the off state. In other words, the voltage detection circuit 130 is in the working state only during the switching period of the selected power supply mode (that is, in the power supply suspension mode), and is in the off state in the steady state, to reduce additional power consumption. For example, in the normal state (that is, in the selected power supply mode), the voltage detection circuit 130 turns off all internal voltage detection components, for example, turns off (disconnects) all input-level switches (for example, Sw12 to Sw14 or Sw16 to Sw19) and disables all working components (for example, stops supplying power to 133 to 137 or 143 to 145), and makes an output (that is, the control signal EN2) of the voltage detection circuit 130 maintain at a high level (for example, only an input-level switch (not shown) is turned on to connect the output end of the voltage detection circuit 130 to the power supply voltage VDD). In the power supply suspension mode, the voltage detection circuit 130 is driven to be switched to the working state, that is, all internal voltage detection components are turned on. For example, all input-level switches are turned on and all working components are enabled, and the level of the control signal EN2 is determined by the operation of the output level (for example, the logic circuit 135 or the digital circuit 145) (for example, output-level switches coupled between the output end of the voltage detection circuit 130 and the power supply voltage VDD are disconnected).

In conclusion, the voltage modulation circuit and the method thereof according to the instant disclosure can temporarily turn off the charge pump circuit 110 (that is, changed to a specific power supply mode) when the switching of the selected power supply mode meets the specific condition, so that a post-stage load (such as an amplifier circuit) proactively draws current to make the output voltage change slowly. Therefore, an original residual charge does not recharge to a power supply, but can be effectively used without loss, thereby helping reduce long-term power consumption and eliminate heat accumulation. In addition, a circuit architecture of the voltage detection circuit 130 used herein is very easy to implement, does not require high resolution, and requires a relatively small hardware area. In some embodiments, the voltage detection circuit 130 is normally in an off state, and is only activated when the switching of the selected power supply mode meets the specific condition, so that no additional power consumption is caused. In some embodiments, an audio load 30 (for example, a speaker or a headset) driven by the post-stage circuit 20 can also be prevented from generating pop noise.

What is claimed is:

1. A voltage modulation circuit, comprising:
   a charge pump circuit, supporting a plurality of power supply modes with different conversion rates and configured to perform a power supply operation in a selected power supply mode of the plurality of power supply modes according to a control signal, to convert a power supply voltage into at least one output voltage, and to output a wake-up signal when switching of the selected power supply mode meets a specific condition; and
   a voltage detection circuit, coupled to the charge pump circuit, activated by the wake-up signal and configured to detect the at least one output voltage and to suspend the power supply operation of the charge pump circuit according to a magnitude of the at least one output voltage.

2. The voltage modulation circuit according to claim 1, wherein when the charge pump circuit suspends the power supply operation, a post-stage circuit draws current from the charge pump circuit.

3. The voltage modulation circuit according to claim 1, wherein the at least one output voltage comprises a positive output voltage and a negative output voltage, and the voltage detection circuit comprises:
   a first switch, normally in an off state, configured to be turned on in response to the wake-up signal;
   a first division circuit, configured to receive the positive output voltage through the first switch and to generate a first divided voltage by using the positive output voltage;
   a first comparator, configured to compare the first divided voltage with a first reference voltage to generate a first comparison result;
   a second switch, normally in an off state, configured to be turned on in response to the wake-up signal;
   a second division circuit, configured to receive the negative output voltage through the second switch and to generate a second divided voltage by using the negative output voltage;
   a second comparator, configured to compare the second divided voltage with a second reference voltage to generate a second comparison result; and
   a logic circuit, configured to suspend the power supply operation of the charge pump circuit according to the first comparison result and the second comparison result.

4. The voltage modulation circuit according to claim 3, wherein the logic circuit outputs a disable signal to the charge pump circuit for suspending the power supply operation when the first divided voltage is not lower than the first reference voltage and the second divided voltage is lower than the second reference voltage, wherein the logic circuit stops outputting the disable signal when the first divided voltage is lower than the first reference voltage or the second divided voltage is not lower than the second reference voltage, so that the charge pump circuit resumes the power supply operation, and wherein the logic circuit is an OR gate.

5. The voltage modulation circuit according to claim 3, wherein the logic circuit outputs a disable signal to the charge pump circuit for suspending the power supply operation when the first divided voltage is not lower than the first reference voltage or the second divided voltage is lower than the second reference voltage, wherein the logic circuit stops outputting the disable signal when the first divided voltage is lower than the first reference voltage and the second divided voltage is not lower than the second reference voltage, so that the charge pump circuit resumes the power supply operation, and wherein the logic circuit is an AND gate.

6. The voltage modulation circuit according to claim 3, wherein the voltage detection circuit further comprises:
   a first debounce circuit, coupled between the first comparator and the logic circuit; and
   a second debounce circuit, coupled between the second comparator and the logic circuit.

7. The voltage modulation circuit according to claim 1, wherein the at least one output voltage comprises a positive output voltage and a negative output voltage, and the voltage detection circuit comprises:
   a first switch, normally in an off state, configured to be turned on in response to the wake-up signal;
   a first division circuit, configured to receive the positive output voltage through the first switch and to generate a first divided voltage by using the positive output voltage;
   a first analog to digital converter, configured to generate a first digital signal corresponding to the positive output voltage according to the first divided voltage and a first reference voltage;
   a second switch, normally in an off state, configured to be turned on in response to the wake-up signal;
   a second division circuit, configured to receive the negative output voltage through the second switch and to generate a second divided voltage by using the negative output voltage;
   a second analog to digital converter, configured to generate a second digital signal corresponding to the negative output voltage according to the second divided voltage and a second reference voltage; and
   a digital circuit, configured to suspend the power supply operation of the charge pump circuit according to the first digital signal and the second digital signal.

8. The voltage modulation circuit according to claim 1, wherein when the charge pump circuit is restored to perform the power supply operation in the selected power supply mode, the voltage detection circuit is switched to an off state.

9. The voltage modulation circuit according to claim 1, wherein when suspending the power supply operation, the charge pump circuit keeps being disconnected from the power supply voltage.

10. The voltage modulation circuit according to claim 1, wherein the charge pump circuit comprises:
   a mode control circuit, configured to generate a plurality of switch signals corresponding to the selected power supply mode according to the control signal and to output the wake-up signal when the switching of the selected power supply mode meets the specific condition;
   a first storage capacitor;
   a second storage capacitor;
   a first flying capacitor;
   a second flying capacitor; and
   a switch circuit, configured to control an electrical connection relationship between the power supply voltage, the first flying capacitor, the second flying capacitor, the first storage capacitor, the second storage capacitor, and a ground according to the plurality of switch signals.

11. The voltage modulation circuit according to claim 10, wherein when the charge pump circuit suspends the power supply operation, the switch circuit remains disconnected from the power supply voltage and maintains electrical connection of the first flying capacitor, the second flying capacitor, the first storage capacitor, and the second storage capacitor to a post-stage circuit.

12. A voltage modulation method, comprising:
   switching from one of a plurality of power supply modes with different conversion rates to another one of the plurality of power supply modes according to a control signal, to be as a selected power supply mode;
   performing, by a power supply circuit, a power supply operation in the selected power supply mode, to convert a power supply voltage into at least one output voltage for supplying power to a post-stage circuit;
   outputting a wake-up signal when the switching step meets a specific condition;
   starting a detection process of the at least one output voltage according to the wake-up signal; and
   suspending the power supply operation of the power supply circuit according to a magnitude of the at least one output voltage under the detection process.

13. The voltage modulation method according to claim 12, further comprising:
   drawing, by the post-stage circuit, current when the power supply operation of the power supply circuit is suspended.

14. The voltage modulation method according to claim 12, wherein the at least one output voltage comprises a positive output voltage and a negative output voltage, and the step of suspending the power supply operation of the power supply circuit according to the magnitude of the at least one output voltage comprises:
   detecting the positive output voltage and the negative output voltage;
   outputting a disable signal when an absolute value of either the positive output voltage or the negative output voltage exceeds a specific threshold, so that the power supply circuit suspends the power supply operation; and
   stopping outputting the disable signal when neither the absolute value of the positive output voltage nor the absolute value of the negative output voltage exceeds the specific threshold, so that the power supply circuit is restored to perform the power supply operation.

15. The voltage modulation method according to claim 12, wherein the at least one output voltage comprises a positive output voltage and a negative output voltage, and the step of suspending the power supply operation of the power supply circuit according to the magnitude of the at least one output voltage comprises:
   detecting the positive output voltage and the negative output voltage;
   outputting a disable signal when both an absolute value of the positive output voltage and an absolute value of the negative output voltage exceed a specific threshold, so that the power supply circuit suspends the power supply operation; and
   stopping outputting the disable signal when the absolute value of either the positive output voltage or the negative output voltage does not exceed the specific threshold, so that the power supply circuit is restored to perform the power supply operation.

16. The voltage modulation method according to claim 12, wherein the step of suspending the power supply operation of the power supply circuit according to the magnitude of the at least one output voltage comprises:
   generating at least one divided voltage according to the at least one output voltage respectively;
   comparing the at least one divided voltage with at least one reference voltage to generate at least one comparison result respectively; and
   suspending the power supply operation of the power supply circuit according to the at least one comparison result of the at least one divided voltage.

17. The voltage modulation method according to claim 12, wherein the step of suspending the power supply operation of the power supply circuit according to the magnitude of the at least one output voltage comprises:
   generating the at least one divided voltage according to the at least one output voltage respectively;
   generating a digital signal corresponding to each of the at least one output voltage according to the divided voltage corresponding the output voltage and a corresponding reference voltage; and
   suspending the power supply operation of the power supply circuit according to the digital signal corresponding to the at least one output voltage.

18. The voltage modulation method according to claim 12, further comprising:
   closing the detection process when the power supply circuit is restored to perform the power supply operation in the selected power supply mode.

19. The voltage modulation method according to claim 12, wherein when the power supply operation of the power supply circuit is suspended, the power supply circuit keeps being disconnected from the power supply voltage.

20. The voltage modulation method according to claim 12, wherein the power supply circuit comprises a plurality of capacitors, and when the power supply operation of the power supply circuit is suspended, the plurality of capacitors keep being disconnected from the power supply voltage but keep being coupled to the post-stage circuit.

* * * * *